(12) United States Patent
Reed et al.

(10) Patent No.: US 6,292,253 B1
(45) Date of Patent: *Sep. 18, 2001

(54) APPARATUS FOR CREATING IN-LINE INDEX PRINTS

(75) Inventors: William George Reed; Virginia Lee Aldrich, both of Seattle; John Oliver Renn, Lake Forest Park, all of WA (US)

(73) Assignee: Digital Now, Inc., Vienna, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/237,203

(22) Filed: Jan. 25, 1999

Related U.S. Application Data

(63) Continuation of application No. 08/768,818, filed on Dec. 18, 1996, now Pat. No. 5,864,387.

(51) Int. Cl.[7] .............................. G03B 27/52; G03B 27/80
(52) U.S. Cl. ................................ 355/40; 355/38; 355/39; 355/41
(58) Field of Search .................................. 355/38, 39, 40, 355/41, 70, 27, 68; 358/501, 506, 302

(56) References Cited

U.S. PATENT DOCUMENTS

| | | |
|---|---|---|
| 3,699,349 * | 10/1972 | Paulus et al. ........................ 355/68 |
| 3,760,174 | 9/1973 | Boenning et al. . |
| 4,918,484 | 4/1990 | Ujiie . |
| 4,922,333 | 5/1990 | Nutting et al. . |
| 4,933,773 * | 6/1990 | Shiota et al. .......................... 358/302 |
| 4,966,285 | 10/1990 | Otake et al. . |
| 5,191,406 | 3/1993 | Brandestini et al. . |
| 5,274,418 | 12/1993 | Kazami et al. . |
| 5,400,152 | 3/1995 | Manico et al. . |
| 5,447,827 | 9/1995 | Ishikawa et al. . |
| 5,745,252 | 4/1998 | Rauh et al. . |

* cited by examiner

*Primary Examiner*—Russell Adams
*Assistant Examiner*—Peter B. Kim
(74) *Attorney, Agent, or Firm*—Andrea G. Reister; Covington & Burling

(57) ABSTRACT

An in-line index printing system includes a sensor that determines the average density value of a photographic frame, a programmable light source and a video camera. The average density value calculated by the sensor is used to set the current levels supplied to a set of red, green, and blue LEDs to produce light that compensates for the exposure and color characteristics of the photographic frame. The film is illuminated by the light produced by the programmable light source and the video camera captures an image of a frame on the film. The image is digitized, and stored in a memory of a computer where it can be manipulated, if desired to enhance the color. The images from the frames can be printed on a color laser printer, a CRT printer, or transmitted over a computer network, such as the Internet.

16 Claims, 6 Drawing Sheets

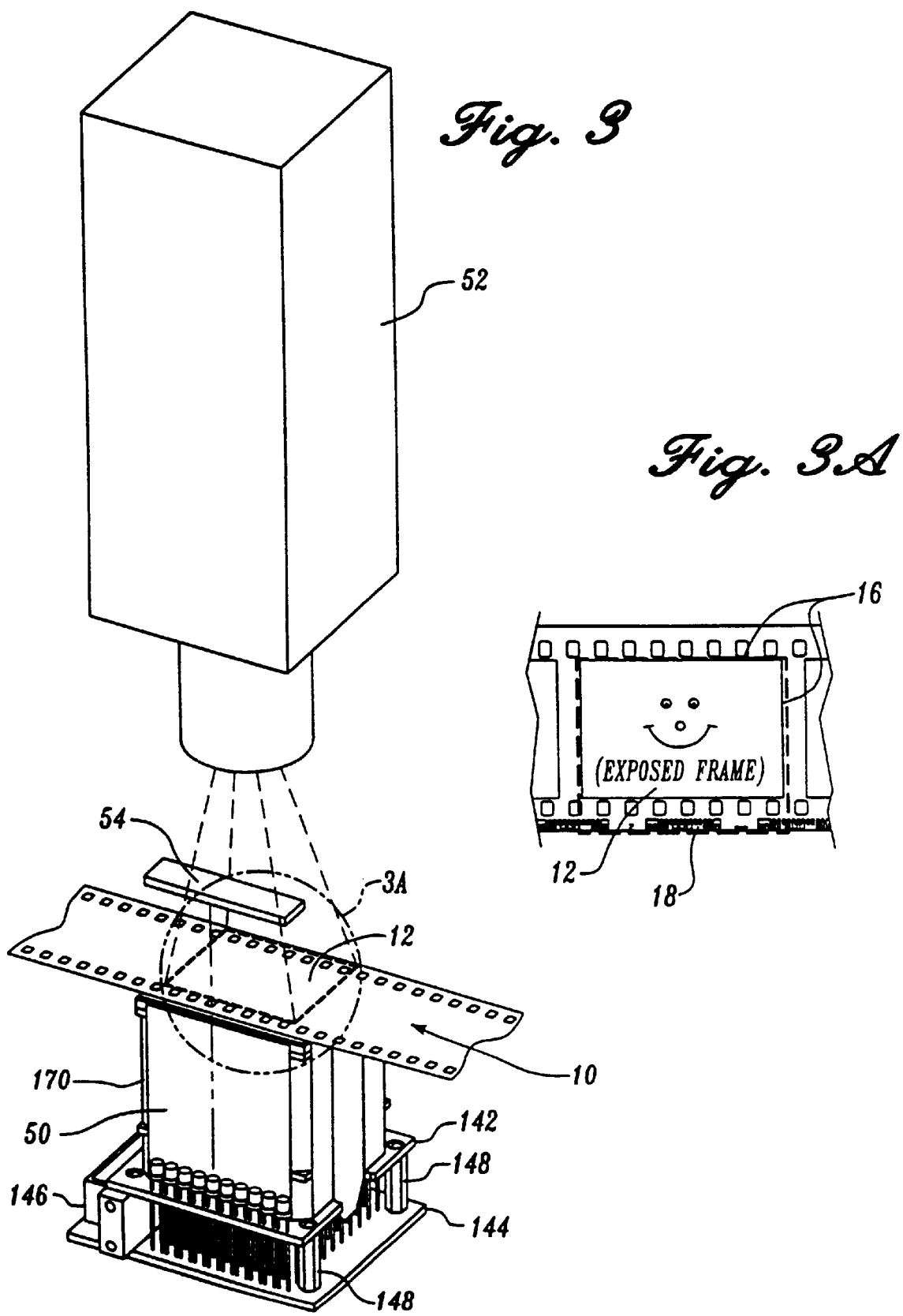

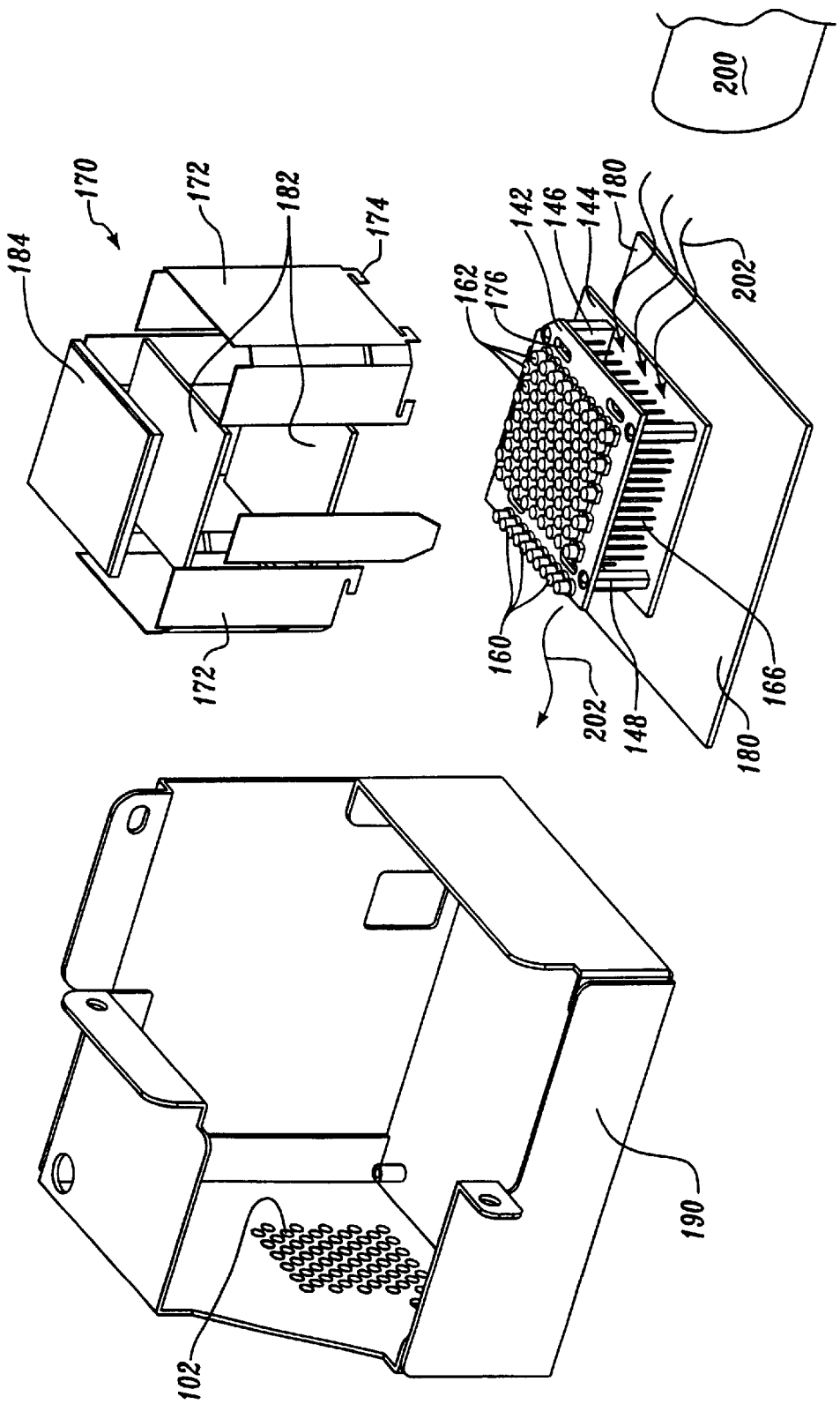

APPARATUS FOR CREATING IN-LINE INDEX PRINTS

RELATED APPLICATION

The present application is a continuation of U.S. patent application Ser. No. 08/768,818, filed Dec. 18, 1996, now U.S. Pat. No. 5,864,387, the benefit of which is claimed under 35 U.S.C. § 120.

FIELD OF THE INVENTION

The present invention relates generally to photographic processing equipment, and in particular to systems for creating index prints.

BACKGROUND OF THE INVENTION

The majority of photographs taken by amateurs are processed at large film processing centers that can print thousands of photographs per hour. Here, the rolls of film are received, spliced together on large spools, and developed before the individual photographs are printed on a high speed printing machine.

Most high speed photographic printers are programmed to print an area of film that is marked with a notch. To mark the location of each frame on a film, the spools of film are loaded on a frame notching machine that scans the film, determines the position of each frame and places a notch in the correct position. Once the entire spool of film has been notched, the spool is then loaded onto a high speed printer that exposes a continuous web of photographic paper with the area of film marked by the individual notches. After the prints are developed and dried, they are cut into individual photographs and packaged for a customer.

In addition to creating a set of prints from a roll of film, many film processing companies are now offering to provide their customers with an index print. An index print is a single print that contains a small image of each frame on the film. Each image is printed with its corresponding frame number so that a user can quickly view the entire set of prints in order to facilitate ordering copies of selected prints.

Presently, the creation of index prints requires additional equipment and processing steps to be performed by the film developer. Because of variations in the exposure of each frame on the film as well as the different color characteristics of various film types, the printing of the individual frames on the index print had to be carefully monitored in order to produce the best quality picture. This not only increases the cost to produce an index print, but reduces the overall rate at which film can be processed.

SUMMARY OF THE INVENTION

The present invention is directed to a system for creating in-line index prints. A supply of film is wound over a set of guide rollers and a capstan to a take-up reel. A prescan sensor is programmed to compute the average density of an individual frame on the film as the film is advanced by the capstan. The average density value is transmitted to a computer system that controls a programmable light source to produce light that compensates for variations in the exposure of the frame and the color characteristics of the film. A video camera is positioned over the programmable light source. As the frame for which the average density value has been computed is passed between the programmable light source and the video camera, an image of the frame is captured by the computer system. The image can be printed on a color laser printer, a CRT printer, or stored in the computer system for later retrieval.

The programmable light source preferably comprises a plurality of red, green, and blue light emitting diodes (LEDs) that are driven with a current that is selected by the computer system. The light source is capable of color and brightness changes much faster than conventional light sources. In one embodiment of the invention, the exposure time of the video camera remains fixed and the intensity of the light source is varied to correct for differences in the exposure of the individual picture frames as well as the color characteristics of the film. Alternatively, the LEDs can be driven with a current that is selected by the computer system to compensate for the color characteristics of the film and the drive time of the LEDs can be altered to compensate for variations in the exposure of the film.

In the presently preferred embodiment of the invention, the index printing system of the present invention works in conjunction with a film notching mechanism that operates by placing notches on the film at the location of each individual frame. The programmable light source and video camera are disposed in-line with a film notcher so that additional photographic processing equipment is not needed to produce the index print.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 illustrates a programmable light source and video camera used in the index printing system of the present invention;

FIG. 3A illustrates the field of view seen by the video camera shown in FIG. 3;

FIG. 5 illustrates the construction of a light box in which the programmable light source is enclosed.

DETAILED DESCRIPTION OF THE PREFERRED EMBODIMENT

The present invention is a system for producing index prints of photographic film that does not require the use of an additional film transport mechanism or slow the rate at which film can be developed and printed.

Figure 1:
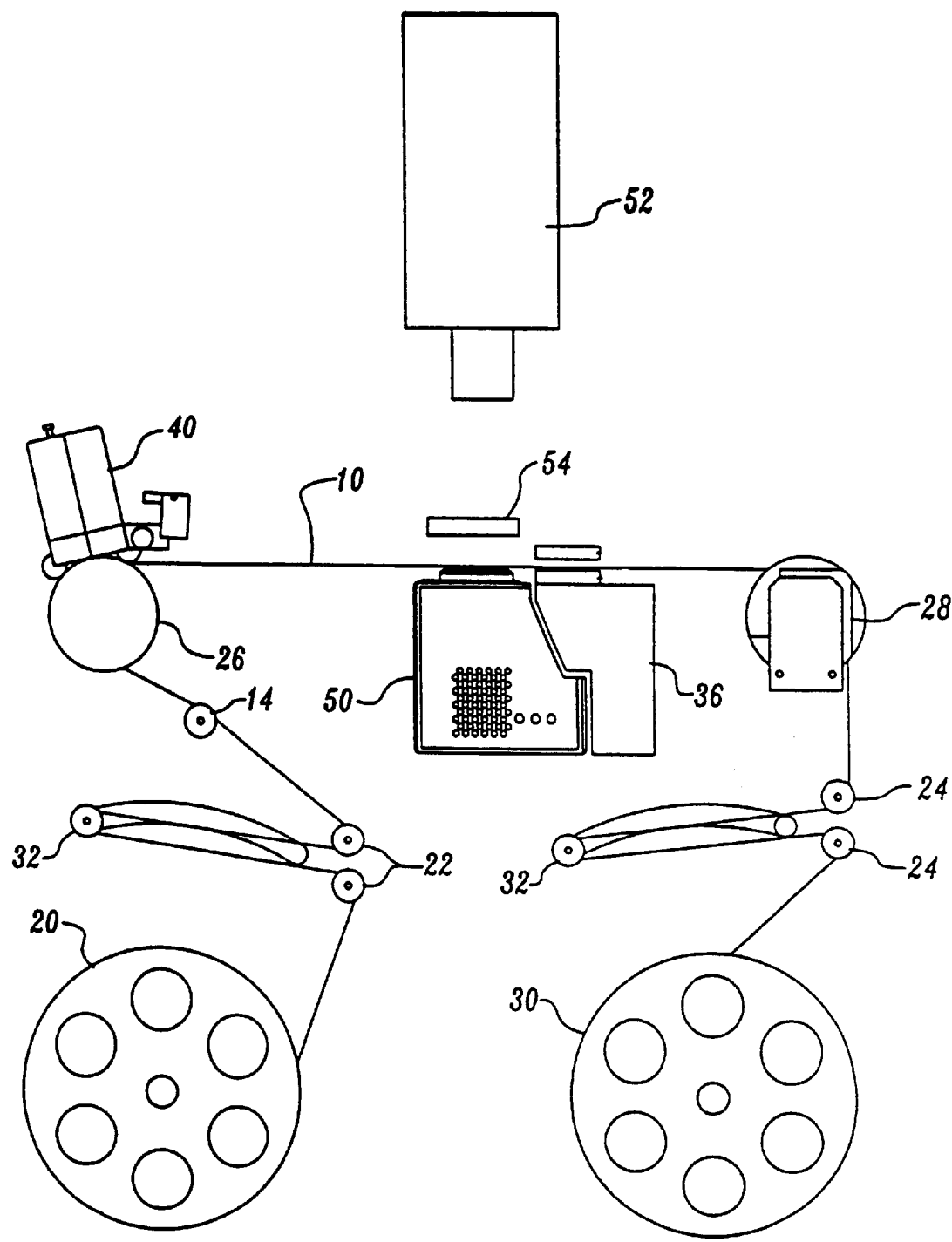
FIG. 1 illustrates an in-line index printing system according to the present invention.

According to the present invention, FIG. 1 illustrates the path traveled by a rolled film in the index printing system. As will be described in further detail below, the index printing system includes a programmable light source and a color video camera that produce images of the individual frames on the film. The light source and video camera are positioned in-line with a conventional film notching system that marks the position of the individual frames on a roll of photographic film. The location of the light source and video camera are able to take advantage of the film transport mechanism of the notching system, thereby eliminating the need for the index printing system to operate as a stand alone machine.

The film notching system generally comprises a supply reel 20, a take-up reel 30, a capstan 26 and a film notcher 36. To notch the film, a supply of film 10 is taken off the supply reel 20 and passed over a first set of guide rollers 22 to the capstan 26. The film is then passed through a notching mechanism 36 to a film motion sensor 28. After passing through the film motion sensor, the film is wound through a second set of guide rollers 24 that are disposed between the film motion sensor 28 and the take-up reel 30. Each set of guide rollers 22 and 24 also include a spring biased tension roller 32 over which the film is wound to maintain the proper tension of the film.

Positioned over the capstan 26 is a prescan sensor 40 that operates to determine the density of the film passing under the sensor. In the presently preferred embodiment of the invention, the prescan sensor 40 comprises a large area silicon photodiode (Model No. 12-30-004, available from UDT Sensors, Inc.) and a light source. Light produced by the light source passes through the film to the sensor in an amount that depends upon the density of the exposed images on the film. Based on the density readings produced by the sensor, a microprocessor within the film notcher 36 calculates the center of each frame on the film. Once the microprocessor has determined the position of a frame, a "distance to advance" signal is sent to the film notcher 36. The film notcher then waits for a predetermined number of advances of a stepper motor within the capstan before activating a punch 36a that marks the location of the frame on the film 10.

Figure 1A:
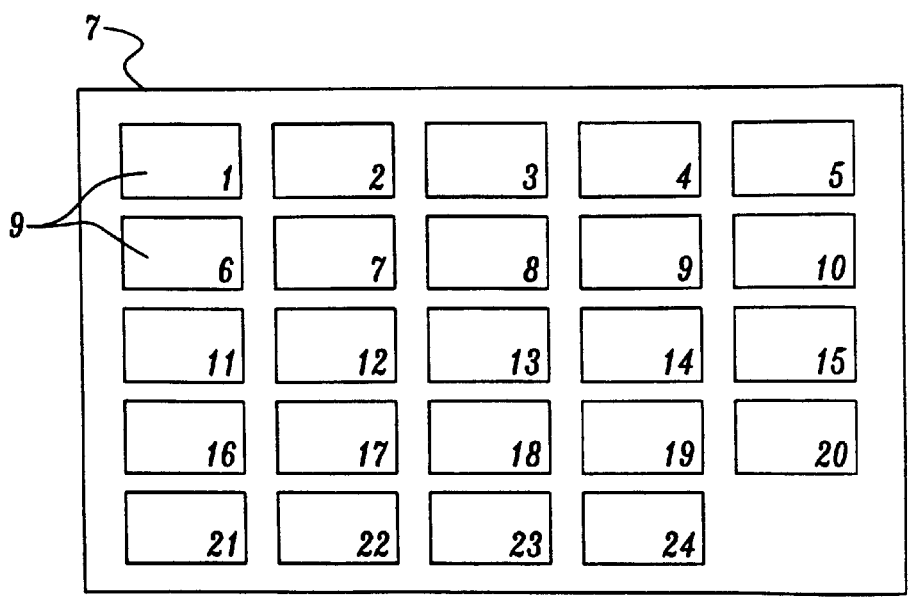
FIG. 1A illustrates a typical index print.

Positioned between the capstan 26 and the film notcher 36 is the index printing system that is the subject of the present invention. The index printing system operates to create an index print of the type shown in FIG. 1A. The index print 7 is a single photograph that contain images of each individual frame 9 on a film. Each image is printed with its corresponding frame number, so that the owner of the film can easily determine the prints they would like to have copied.

Returning to FIG. 1, the index printing system operates by programming the microprocessor within the prescan sensor 40 to determine the average density of the area occupied by each frame on the film. The average density varies with the type of film, the speed of the film, and the length of time for which the frame was exposed. The average density readings from the sensor are transmitted to the film notcher 36 which, in turn forwards the information to a computer system that calculates an appropriate setting for the programmable light source 50 to ensure that the image captured by the video camera 52 is properly exposed and color balanced.

As will be appreciated from the illustration in FIG. 1, the prescan sensor 40 is located some distance away from the programmable light source 50. Therefore, the average density for a frame that is located under the sensor is stored in the computer system until the frame is advanced to a position that is directly over the light source 50. In the presently preferred embodiment of the invention, the light source is positioned exactly one frame width away from the film notching mechanism 36. Therefore, as the film is stopped in preparation to activate the punch 36a, the light source 50 is activated to produce light in accordance with the previously stored average density information and the image of the frame is captured. The advantage of positioning the prescan sensor 40 ahead of the programmable light source 50 is that the index printing system has sufficient time to compute the appropriate settings for the color and intensity of the light used to expose the frame before the frame is moved in front of the camera. In addition, the electronics within the light source have a chance to settle before the image of the frame is captured.

Also included in the index printing system is a mirror 54 that is positioned above the film to reflect light from the light source 50 on to the top surface of the film. As will be described in further detail below, the mirror 54 illuminates the upper surface of the film in order for the camera to capture the barcoded, splice information that is printed on opaque stickers that are used to splice rolls of film together.

Figure 2:
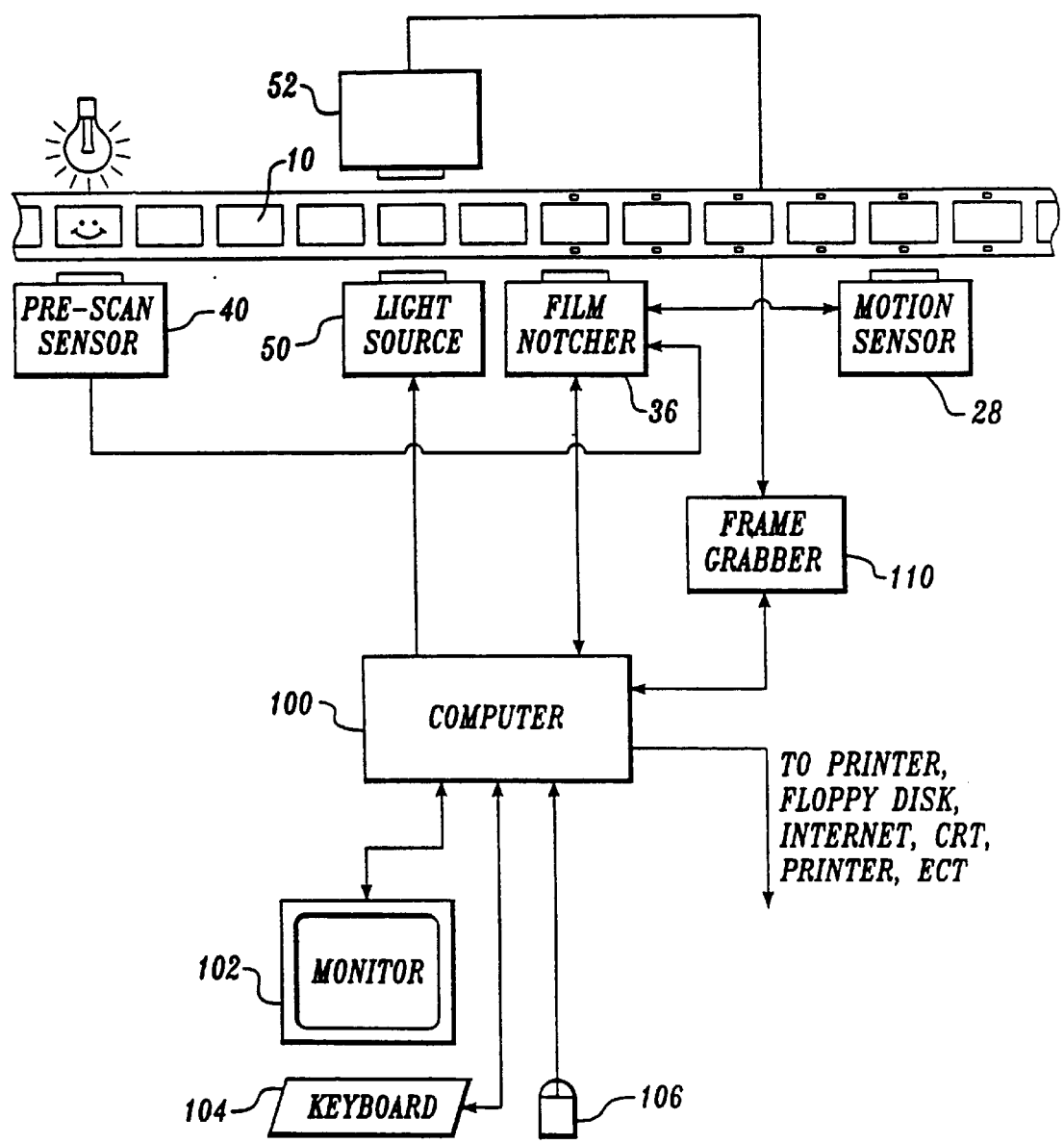
FIG. 2 is a block diagram of a computer system that operates the in-line index printing system of the present invention.

FIG. 2 shows a block diagram of a computer system that operates the index printing system of the present invention. The average density information calculated for each frame by the prescan sensor 40 is received by a general purpose, IBM compatible computer 100 of the type that includes a central processing unit, memory and a persistent storage mechanism, such as a hard drive. An operator of the index printing system interfaces with the computer system via a conventional video monitor 102, keyboard 104, and a pointing device 106 (such as a mouse).

As indicated above, the average density information for each frame is received by the computer system 100, where it is stored in memory until the frame is moved to a position between the programmable light source 50 and the video camera 52. The computer system then signals the light source to produce a light having the predetermined brightness and color. System 100 simultaneously activates a frame grabber circuit 110 to begin storing the video signals produced by the color video camera 52. The video signals are digitized and stored in the memory of the computer system where they can be manipulated by the user of the computer system in order to make minor corrections to the contrast or color, if desired. The computer system stores the digital image of each frame on a disk drive for later retrieval. The images can then be printed on a CRT printer, color laser printer, stored on a floppy disk and given to a customer, or transmitted over a computer network such as the Internet.

FIG. 3 shows the construction of the programmable light source 50 and its relation to the video camera 52. The light source 50 generally comprises an arrangement of red, green, and blue light emitting diodes that are energized to produce the light that is received by the video camera 52. Each of the LEDs is secured in a printed circuit board 142. Each LED has a pair of wire leads that deliver current to and from the LED. The wire leads extend downward through the printed circuit board 142 to a second printed circuit board 144 that is spaced from the first circuit board 142 by a spacer block 146 and a pair of barrel type spacers 148. Printed on the second circuit board 144 are a series of traces that connect each of the LEDs to a driving circuit that delivers an electric current to the LEDs. By exposing wire leads between the first and second printed circuit boards 142 and 144, the leads act as heat exchangers to draw heat away from the LEDs as they are energized.

Figure 4:
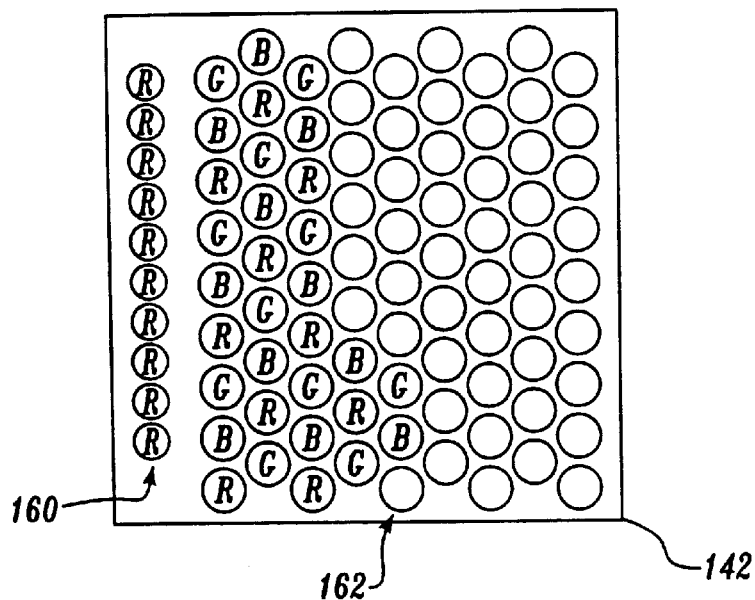
FIG. 4 illustrates an arrangement of red, green, and blue light-emitting diodes that comprise the programmable light source.

FIG. 4 shows in greater detail the orientation of the LEDs on the printed circuit board 142. The LEDs are divided into two groups. A first group of LEDs 160 comprises ten red light-emitting diodes that are disposed in a row along an edge of the printed circuit board 142. A second group of LEDs 162 comprises a roughly square array of 9×9 red, green, and blue LEDs. Each of the LEDs is positioned so that no two adjacent LEDs are the same color. The first group of red LEDs 160 is used to illuminate the top surface of the film in order to read the splice markings, while the second group of LEDs 162 is used to illuminate an exposed frame on the film.

Returning now to FIG. 3, the light produced by the second group of LEDs 162 is contained within an enclosure 170 that prevents the white light produced from mixing with the light produced by the first group of LEDs 160. The group of red LEDs 160 lies outside the enclosure 170 and light produced by these LEDs is reflected off the mirror 54 onto the upper surface of the film 10 before it is detected by the camera 52. The mirror 54 is needed to illuminate the top surface of the film because the rolls of film are spliced together with opaque stickers that may have barcodes printed on them. By illuminating the top surface of the film, the camera is able to get an image of the barcodes (or human readable numbers) which can be deciphered by the computer system using conventional character recognition techniques.

FIG. 3A shows the field of view detected by the color video camera 52 in response to light produced by the groups of LEDs 160 or 162. The camera 52 is able to view an area defined by a boundary 16 that includes an exposed frame 12 along with a DX barcode 18 that is printed on an edge of the film. The DX code indicates the type of film, its speed, and each individual frame number. After an image of the field of view has been captured by video camera and stored in the computer system, the computer system analyzes the image in order to decipher the DX barcode and determine the film type and frame number. The barcode information is stored in the computer system, after which the image is cropped by the computer system to include only the area occupied by the frame 12.

FIG. 5 shows an exploded view of the construction of the programmable light source 50. The two printed circuit boards 142 and 144 are mounted to a controller board 180 that includes the driving circuits for the LEDs. As discussed above, the wire leads of the LEDs extend between the two printed circuit boards 142 and 144 in order to act as a heat exchanger. A source of cool air 200, such as a fan, blows an airstream 202 through the space between the printed circuit boards 142 and 144 to draw heat away from the LEDs as they operate.

Positioned over the set of red, green, and blue LEDs 162 is the enclosure 170. The enclosure is preferably made of a pair of opaque sidewalls 172 that include one or more tabs 174 disposed around the lower periphery of the enclosure. The tabs 174 fit within corresponding slots 176 on the printed circuit board 142 in order to secure the enclosure to the printed circuit board. A number of diffusing filters 182 are supported in a column within the enclosure 170. The diffusing filters act to create a uniform light field from the light created by the individual red, green, and blue LEDs. A glass cover 184 is positioned at the top of the enclosure 170 to prevent dust and other contaminants from entering the enclosure. The entire light assembly including the LEDs and the enclosure 170 is surrounded by a cover 190. The cover includes a series of holes 192 that are disposed in one of the side walls to serve as an exhaust port for the airstream 202 that cools the LEDs.

Figure 6:
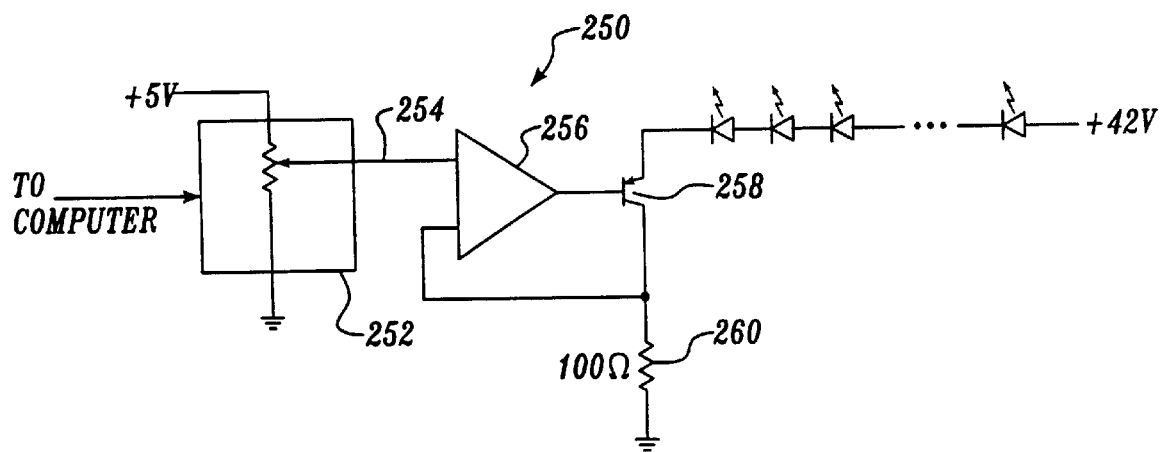
FIG. 6 is a schematic diagram of a constant current circuit that drives the light-emitting diodes of the programmable light source.

FIG. 6 is a circuit diagram of a driving circuit that causes the LED arrays to produce light of a given brightness and color density. The driving circuit 250 includes a digital potentiometer 252 that receives a 5-volt supply voltage. The digital potentiometer is controlled by the computer system to produce a variable voltage on a lead 254 that is coupled to a non-inverting input of an operational amplifier 256. An output of the operational amplifier 256 is coupled to a base input of an NPN bipolar transistor 258. An emitter of the transistor 258 drives a resistor 260 that is connected in series to ground. Also coupled to the junctional of the emitter and the resistor 260 is an inverting input of the operational amplifier 256. A number of LEDs are connected in series between a +42 volt supply and a collector junction of the transistor 258.

The driving circuit 250 operates as a constant current source. By varying the voltage supplied on the lead 254 of the digital potentiometer, the computer system can accurately control the brightness of the series connected LEDs.

In the presently preferred embodiment of the invention, a driving circuit controls the current through nine serially connected LEDs of the same color. In operation, the computer system controls the voltage produced by the digital potentiometers in accordance with the average density value that is determined by the prescan sensor 40 shown in FIG. 1, so that the light produced by the set of red, green, and blue LEDs has a color balance and intensity that will properly expose the film onto the color video camera. A single driving circuit is used to control the intensity of light produced by the single row of red LEDs 160.

The relationship between the average density value for a particular frame and the settings of the circuits that drive the LEDs to expose the frame is determined by calibration. To calibrate the system a user utilizes a standard calibration film that is made by a film's manufacturer. The calibration film consists of a series of pictures taken of a scene containing gray scale and colored areas of known densities and color values, wherein each picture has a slightly different exposure level. The index printing system is calibrated by having the prescan sensor determine the average density value for each frame of the calibration film and adjusting the level of current supplied to the red, green, and blue LEDs until an image with gray scale and colored areas matching the known densities and colors of the original scene is obtained from the color video camera 52. The relationship between the current supplied to the red, green, and blue values for a given density value is stored in the computer. The process is repeated for each test frame on the calibration film.

Once the optimum current values for the red, green, and blue LEDs have been determined for each frame in the calibration film, the computer system interpolates the results to calculate the proper current settings for each possible average frame density value. The current settings are stored in a look-up table with the computers memory so that when the computer system receives a particular average density value, the correct red, green, and blue current settings can be quickly determined.

In the system described above, the exposure time of the color video camera remains fixed and intensity of the light produced by the programmable light source is varied to compensate for both variations in the exposure of the frame and the color characteristics of the film itself. In an alternative embodiment of the invention, it is also possible to fix the color content and the intensity of the light produced by the programmable light source for each type of film and to vary the exposure time of the color video camera by varying the pulse length of the LED drive. This latter approach may be beneficial because most LEDs have a nonlinear efficiency curve and may change color slightly when driven with varying amounts of current. By keeping the current fixed and varying the LED drive time, calibration of the system is simplified.

Another alternative embodiment of the invention utilizes a black and white video camera instead of a color video camera. If a black and white camera is used, three exposures of each frame must be taken using light produced by the red, green and blue LEDs separately. The resulting images can then be combined in the computer to produce a color image. This approach may be more cost effective since high resolution black and white video cameras are inexpensive. However, the processing time is increased, due to the three separate images that must be obtained for each frame.

Still another embodiment of the invention may be realized without the use of the prescan sensor. Instead, the programmable light source can be programmed to produce light having a known intensity and color content. This light is used to expose the frame and the resulting image is analyzed to determine if adjustments need to be made to the light source. If necessary, the color and/or intensity of the light produced by the programmable light source is adjusted and a second image is captured. While this approach eliminates the prescan sensor, two images of each frame may need to be obtained.

As indicated above, the present invention is advantageously incorporated into a film notching system. By capturing images of the frames before the film is notched, it is possible to include the DX barcode in the image. Therefore, the frame number can be determined before the DX barcode is potentially destroyed by the notch created with the punch.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for creating index prints from a roll of photographic film, comprising:
   a first spool on which a supply of film having a number of exposed photographic frames can be stored;
   a film advance mechanism for moving the film along a film path;
   a second spool disposed at the end of a film path for taking up the supply of film;
   a sensor disposed along the film path for producing an output signal that is indicative of an exposure of each frame on the film;
   a programmable array of light emitting diodes (LEDs) disposed along the film path wherein the programmable array comprises a plurality of red, green and blue LEDs and a number of drive circuits that cause a selectable current to flow through each of the red, green and blue LEDs to adjust the color and/or intensity of the light produced by the programmable array for a programmable time period;
   a computer that receives the output signal of the sensor and programs the programmable array to produce light having a color that is a function of the exposure of each frame on the film; and
   a camera positioned along the film path to capture an image of each frame of the film, as it moves along the film path, when exposed with the light created by the programmable array.

2. The system of claim 1, wherein the sensor comprises:
   the programmable array that is programmed to produce light with a defined color and intensity and the camera that obtains a test image of a frame that is exposed with the light having the defined color and intensity; and
   the computer that receives the image obtained and calculates the exposure of the frame from the test image.

3. The system of claim 1, wherein the sensor comprises:
   a sensor disposed on the film path that determines a density of the film passing under the sensor.

4. The system of claim 1, wherein each of the LEDs has a pair of wire leads, the LEDs being mounted such that the wire leads are exposed to an airstream to cool the LEDs as they operate.

5. The system, of claim 4, wherein the LEDs are mounted in a pair of circuit boards that are spaced such that the wire leads of each of the LEDs extend between the circuit boards.

6. The system of claim 1, further comprising a film notcher disposed on the film path for creating marks on the film that are indicative of the location of each frame on the film.

7. The system of claim 1, wherein the camera is a color video camera and the computer includes a frame grabber circuit that receives and digitizes an image obtained by the color video camera.

8. The system of claim 1, wherein the camera is a monochrome video camera and the computer includes a frame grabber circuit that receives and digitizes an image obtained by the monochrome video camera from sequential red, green and blue light exposures through the film.

9. The system of claim 1, further comprising:
   a film notcher disposed along the film path.

10. The system of claim 9, wherein the programmable array and the camera are positioned ahead of the film notcher.

11. The system of claim 1, wherein the sensor is disposed ahead of the programmable array along the film path, whereby the system has sufficient time to compute color and intensity light settings.

12. A system for creating index prints from a roll of photographic film, comprising:
   a first spool on which a supply of film having a number of exposed photographic frames can be stored;
   a film advance mechanism for moving the film along a film path;
   a second spool disposed at the end of a film path for taking up the supply of film;
   a sensor disposed along the film path for producing an output signal that is indicative of an exposure of each frame on the film;
   a programmable array comprising a plurality of light emitting diodes (LEDs) disposed along the film path, the programmable array comprising a plurality of drive circuits that cause a selectable current to flow through each of the plurality of LEDs to adjust the color and/or intensity of the light produced by the programmable array for a programmable time period;
   a computer that receives the output signal of the sensor and programs the programmable array to produce light having a color that is a function of the exposure of each frame on the film; and
   a camera positioned along the film path to capture an image of each frame of the film, as it moves along the film path, when exposed with the light created by the programmable array.

13. The system of claim 12, wherein each of the LEDs has a pair of wire leads, the LEDs being mounted such that the wire leads are exposed to an airstream to cool the LEDs as they operate.

14. The system of claim 13, wherein the LEDs are mounted in a pair of circuit boards that are spaced such that the wire leads of each of the LEDs extend between the circuit boards.

15. The system of claim 12, wherein the camera is a color video camera and the computer includes a frame grabber circuit that receives and digitizes an image obtained by the color video camera.

16. The system of claim 12, wherein the camera is a monochrome video camera and the computer includes a frame grabber circuit that receives and digitizes an image obtained by the monochrome video camera from sequential red, green and blue light exposures through the film.

* * * * *